United States Patent [19]

Pintsov

[11] Patent Number: 5,367,450
[45] Date of Patent: Nov. 22, 1994

[54] SYSTEM AND METHOD FOR SELECTING OPTIONAL INSERTS WITH OPTIMAL VALUE IN AN INSERTING MACHINE

[75] Inventor: Leon A. Pintsov, West Hartford, Conn.

[73] Assignee: Pitney Bowes Inc., Stamford, Conn.

[21] Appl. No.: 993,753

[22] Filed: Dec. 21, 1992

[51] Int. Cl.$^5$ .............................................. G06F 15/21
[52] U.S. Cl. .................. 364/401; 364/464.03
[58] Field of Search ............... 364/401, 466, 478, 402, 364/464.03; 270/58; 53/502, 54, 154

[56] References Cited

U.S. PATENT DOCUMENTS

| | | | |
|---|---|---|---|
| 4,571,925 | 2/1986 | Adams | 53/502 |
| 4,639,873 | 1/1987 | Baggarly et al. | 364/466 |
| 4,797,830 | 1/1989 | Baggarly et al. | 364/464.03 |
| 4,817,042 | 3/1989 | Pintsov | 364/478 |
| 4,821,493 | 4/1989 | Pintsov | 53/502 |
| 4,829,443 | 5/1989 | Pintsov et al. | 364/464.03 |
| 4,959,795 | 9/1990 | Christensen et al. | 364/464.03 |
| 5,053,955 | 10/1991 | Peach et al. | 364/401 |

Primary Examiner—Robert A. Weinhardt
Attorney, Agent, or Firm—Charles R. Malandra, Jr.; Melvin J. Scolnick

[57] ABSTRACT

A method of making a selection of optional enclosures for a mailpiece including required enclosures. The method comprises the steps of assigning to each of the optional enclosures a weight, a cost and a benefit, creating a list of the potential compositions of the mailpiece, the list including a total of $2^n$ combinations of the optional enclosures, where n equals the number of optional enclosures, computing a total weight of the mailpiece for each of the potential compositions, computing a value of the mailpiece for each of the potential compositions, the value being any computable function of the benefit and the cost of each optional enclosure included in each of the potential compositions, and selecting from one of the potential compositions based on the one having the optimal value.

5 Claims, 3 Drawing Sheets

SYSTEM AND METHOD FOR SELECTING OPTIONAL INSERTS WITH OPTIMAL VALUE IN AN INSERTING MACHINE

FIELD OF THE INVENTION

The invention disclosed herein relates generally to inserting machines, and more particularly to inserting machines capable of making an intelligent selection of enclosures.

BACKGROUND OF THE INVENTION

Inserting machines with multi-feeder stations are widely utilized for mailing applications in which a plurality of different types of enclosures, such as account related documents, advertising enclosures or documents of general interest, are to be included with a customer's monthly statement. Examples of such applications are monthly statements mailed by utilities, credit card companies, and banking or other financial institutions. Included, typically, with the statement are one or more enclosures, or inserts, which may convey a message to the customers, such as an offer for additional services, a change in policy, or advertisements provided by third parties for inclusion within the monthly statement. Illustrative of such insertion machines are U.S. Pat. Nos. 4,547,856, 4,077,181 and 3,935,429 which are assigned to the assignee of the present invention.

Early applications for inserting machines required that the insertion function be performed in accordance with a predetermined scheme that was fixed for each mailpiece being assembled. For example, in addition to the required statement and other required documents which must be inserted, such as paid bank checks, the inserting machines also insert a pre-specified number of enclosures. The pre-specified number may be programmed into the inserting machine or may be read from a control code printed on one of the required documents.

Although the inserting machines were well suited for such early applications, the market requirements evolved to demand inserting machines capable of making last minute decisions regarding which enclosures are to be included in a mailpiece and a required amount of postage for the mailpiece with the enclosures.

An application where this capability may prove especially advantageous concerns bank checking accounts wherein a variable number of documents expressive of a customer's monthly statement, a variable number of cancelled checks, and possibly one or more inserts of a general or advertising nature are required to be mailed. Due at least to the variation of the number of statement pages and cancelled checks between customers, the required postage for mailpieces produced will consequently vary over a wide range of postage values.

As is well known, the present postage rate categories for first-class letter mail are ultimately based on a final, total weight of a mailpiece. Therefore, any procedure for determining the correct amount of postage for a mailpiece must involve at some point in the procedure a weight-determining step.

The original way for performing such a weight-determining step comprised weighing the stuffed envelope. However, as inserting machine throughputs increased this technique of weighing each mailpiece became less practical, more complex and, hence, more expensive for the customer. Furthermore, such a weighing did not lend itself to supporting other advancements in inserting machine technology, such as a dynamic selection of inserts based on priority levels and/or the "topping off" of a mailpiece with additional inserts to take full advantage of a monetary value of a postage category for the mailpiece.

An alternate method to weighing a stuffed envelope is known to provide an inserting machine with a predetermined per item weight of the inserts held at each of a plurality of feeding stations and to store such per item weights in a data processing memory. A processing means, using the stored per item weights, calculates a total weight of each mailpiece based on the number of inserts selectively fed from the feeding stations. This calculated weight is then utilized to determine the postage category of the mailpiece. Thus, the inserting machine determines which one of a plurality of postage meters, each being set to apply postage relating to a different weight category, will be subsequently activated to apply postage to the mailpiece. Such a machine is disclosed in U.S. Pat. No. 4,571,925 issued to Jerryl Adams. Once a postage category has been determined, it is known to utilize the calculated per item weight of the optional inserts in "topping off" a mailpiece by selectively feeding optional enclosures into a mailpiece without exceeding the postage category. Such a method is disclosed in U.S. Pat. Nos. 4,639,873 and 4,797,830 issued to Baggarly et al. An alternate method of "topping off" is disclosed in U.S. Pat. No. 4,821,493 issue to David Pintsoy.

Although a "topping off" method may improve the value of the mailpiece, it does not necessarily achieve full value benefit of the postage category into which the mailpiece falls. Nor does "topping off" address a problem of the selection of enclosures for inserting based on criteria other than weight, such as demographic or other characteristics of the addressee. A method of prioritizing inserts based on criteria other than weight is disclosed in U.S. Pat. No. 4,817,042 issued to Leon Pintsoy. This method includes a final postage category determination based on the priority of the inserts which are selected for insertion into the mailpiece.

Thus, the multi-feeder station inserting machines have been utilized for applications which require the inserting machine to make intelligent decisions regarding which enclosures are to be included in a mailpiece. Usually these intelligent decisions are made during mailpiece assembly process and are based solely on the expected postage expense, i.e., cost, required for every mailpiece.

For every mailpiece to be assembled by the inserting machine there is a multiplicity of enclosures which fall into two general categories: 1) enclosures which must be included the mailpiece without any reservations, and 2) optional enclosures which may or may not be included.

Enclosures of the first category are usually financial statements, bills, checks and other personalized enclosures which constitute the mandatory content of the message being sent. These enclosures have a cost aspect associated with them which in the context of the present invention is the postage. This is the postage which would have to be paid based on the weight and the level of postal worksharing (presort and prebarcoding) associated with every given mailpiece. This postage also represents the minimal postage which would have to be paid for a given mailpiece.

Enclosures of the second category are usually of advertising or informational nature, which are included or not included into a given mailpiece depending on the potential increase in the postage cost which would have to be incurred, as in U.S. Pat. No. 4,817,042, or only when no increase in postage would occur, as in U.S. Pat. No. 4,639,873. The selection of the best alternative is based either on the total allowed increase in postage and after that the maximal number of enclosures (U.S. Pat. No. 4,817,042) or just a maximal number of enclosures without increase in postage (U.S. Pat. No. 4,639,873). In arriving at the decision inserting machines known in the prior art do not consider a total plurality of possible alternatives but rather sequentially evaluate enclosures for inclusion.

It is an object of the present invention to provide a method for the selection of optional inserts whereby the optimal value, i.e., benefit, of each mailpiece is fully realized.

SUMMARY OF THE INVENTION

It is a general practice in economics and business daily life to make purchasing decisions based on the expected value which include both the cost and the benefit components of different available alternatives. The present invention attempts to overcome the deficiency in the prior art, where essentially purchasing decisions are made based on the cost or some other narrowly defined category, and formulates a very general and adaptive decision process which include as a very special cases previously suggested approaches.

The present invention provides a method for making a selection of optional enclosures for a mailpiece including required enclosures. The method comprises the steps of assigning to each of the optional enclosures a weight, a cost and a benefit, creating a list of the potential compositions of the mailpiece, the list including a total of $2^n$ combinations of the optional enclosures, where n equals the number of optional enclosures, computing a total weight of the mailpiece for each of the potential compositions, computing a value of the mailpiece for each of the potential compositions, the value being a computable function of the benefit and the cost of each optional enclosure included in each of the potential compositions. The final step is selecting the composition having the optimal value.

In one embodiment, the value could be the benefit minus the cost of each optional enclosure included in each of the potential compositions and minus the postage rate of each of the potential compositions. In another embodiment, the benefit could be a ratio of benefit to cost.

DETAILED DESCRIPTION OF THE PRESENT INVENTION

Figure 1:
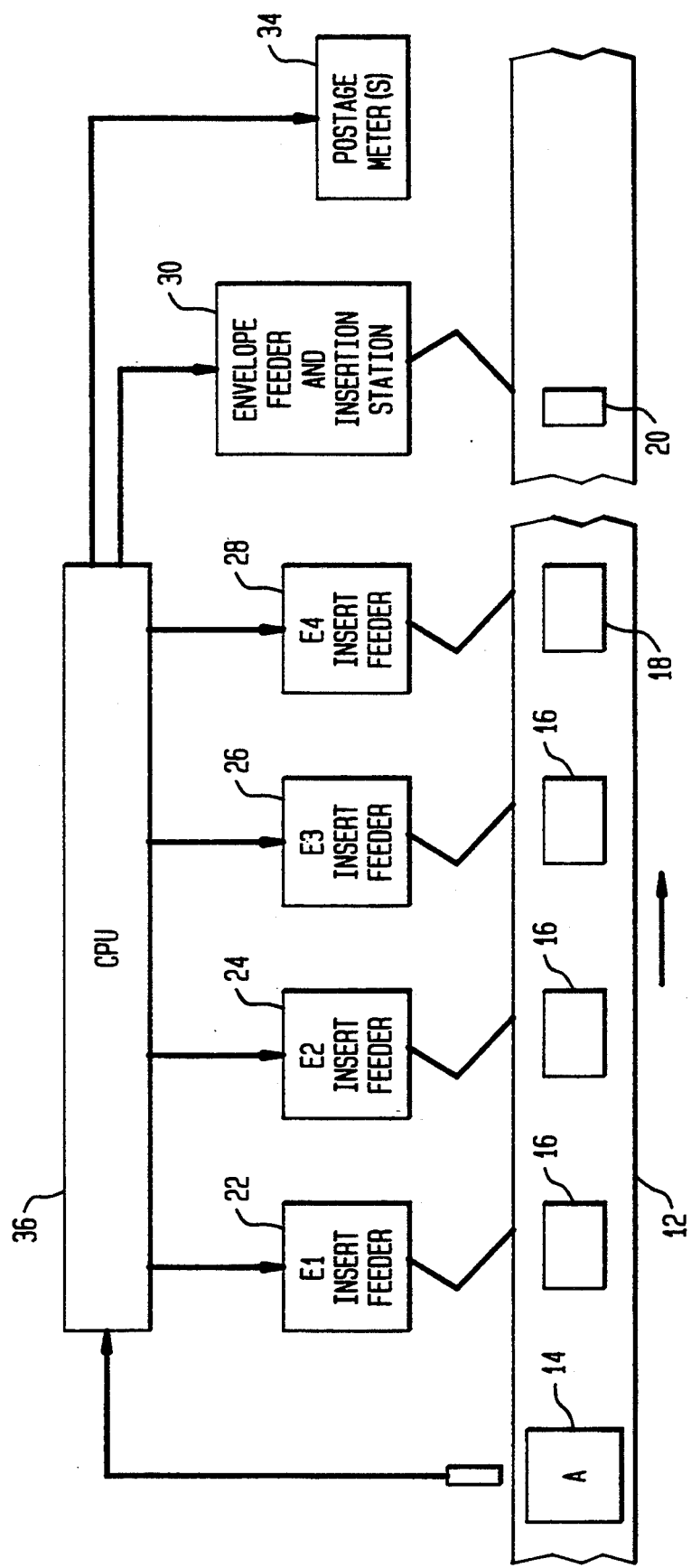
FIG. 1 is a block diagram of an inserting machine having computer controlled selection of optional inserts in accordance with the present invention.

Referring now to FIG. 1, there is shown a portion of a multi-station inserting machine 10 including an embodiment of the present invention. In general, inserting machine 10 operates to feed documents from a plurality of document feeders, including insert feeders 22 through 28, onto a transport deck 12, the documents being accumulated into a collations 16 which are conveyed downstream on deck 12 to an envelope feeder and insertion station 30 where final collations 18 of the documents are inserted into an envelope to form a mailpiece 20. Thereafter, the envelope is sealed and conveyed to a postage meter 34 where a correct amount of postage is applied. The machine, in this illustrative embodiment, is operable for reading an indicia provided on a control document (shown as part of collation 14 of required documents for a mailpiece) which is also conveyed upon deck 12, the indicia being indicative, among other things, of which inserts from the plurality of insert feeders 22 through 28 are to be included within a particular envelope. Controlling the operation of insert feeders 22 through 28 in response to the indicia is a machine processing unit 36. The processing unit 36 is also operable for determining the correct amount of postage for each stuffed envelope and for providing by suitable communication means the postage information to postage meter 34. Meter 34 is comprised of a printer, such as an ink Jet printer, operable for printing a postmark or postage indicia indicative of differing postage amounts upon each successive stuffed envelope depending on the weight of the stuffed envelope.

As previously noted, for every mailpiece to be assembled by the inserting machine there is a multiplicity of enclosures which fall into two general categories: 1) enclosures which must be included the mailpiece without any reservations, and 2) optional enclosures which may or may not be included.

In describing the preferred embodiment of the present invention, the following example will be used. The total assembly of enclosures which belong to the first category is denoted "A" (shown as collation 14 in FIG. 1) and there are four enclosures in the second category denoted E1, E2, E3 and E4 (corresponding to insert feeders 22–28 in FIG. 1). The present invention considers all possible combinations of enclosures for a given mailpiece. In the example used herein, all the potential combinations (all possible alternatives for composition of the mailpiece) are listed in Table I.

TABLE I

| List of Possible Enclosure Combinations |
|---|
| 0. A |
| 1. A + E1 |
| 2. A + E2 |
| 3. A + E3 |
| 4. A + E4 |
| 5. A + E1 + E2 |
| 6. A + E1 + E3 |
| 7. A + E1 + E4 |
| 8. A + E2 + E3 |
| 9. A + E2 + E4 |
| 10. A + E3 + E4 |
| 11. A + E1 + E2 + E3 |
| 12. A + E1 + E2 + E4 |
| 13. A + E1 + E3 + E4 |
| 14. A + E2 + E3 + E4 |
| 15. A + E1 + E2 + E3 + E4 |

The total number of combinations is 16. In the general case of "n" optional enclosures the total number of combinations is equal to:

$$\begin{bmatrix} n \\ 0 \end{bmatrix} + \begin{bmatrix} n \\ 1 \end{bmatrix} + \begin{bmatrix} n \\ 2 \end{bmatrix} + \begin{bmatrix} n \\ n \end{bmatrix} = 2^n$$

where [] denotes the number of ways to choose a k-element subset from an n-element set. In the case of $n=5$, the number of combinations is 32, and in the case of $n=10$, the number of combinations is 1024. The $n=10$ case covers a vast majority of the practically encountered situations. However, even for a larger n the number of combinations to be analyzed is quite manageable even for a modest modern microprocessor.

Which one of the combination alternatives is the "best" one? The answer to this question depends on a criterion for the best. If an objective numerically valued function "VALUE" can be defined on the set of all possible combinations then the maximal value of this function can define the best combination. In a particular embodiment the objective function "VALUE" can be defined as the difference (or the ratio or another function) between the total benefit and the total cost corresponding to a particular combination. The choice of a particular "VALUE" function depends on the considerations employed by the owner of the inserting system. For example, it may depend on the accounting system used by the owner. For the purpose of the present invention, this choice is irrelevant since the scheme described below will work equally as well with any "VALUE" function. (It is assumed, of course, that the computational effort required for calculation of the "VALUE" function depends little on the actual nature of this function which is certainly true for all practical applications.) The total cost, which is the cost of postage and the cost of producing enclosures, can be determined based on the total weight of the mailpiece, worksharing level and the sum of enclosure costs.

In the example use herein, it is assumed, for the sake of simplicity, that the mailpiece to be assembled is not prebarcoded and not a member of presort group (i.e. it is not subject to a discount and will be paid at the full postage rate) and that the weights in ounces of assembly A and enclosures E1, E2, E3, E4 are as follows:

Weight (A)=1.65
Weight (E1)=0.2
Weight (E2)=0.15
Weight (E3)=0.1
Weight (E4)=0.05

For the sake of simplicity, Weight (A) includes the weight of the mailing envelope.

It is also assumed that the cost of producing (or price paid for) each of enclosures E1, E2, E3, E4 are 2¢, 2¢, 3¢, and 3¢ respectively. Then all the possible compositions of the mailpiece will have the incremental costs (i.e. the costs excluding the cost of making assembly A which is set to 0) in 1992 U.S. postal rates listed in Table II.

TABLE II

| Incremental Costs |
| --- |
| 0. Cost (A) = Postage (1.65 oz) = 52¢ |
| 1. Cost (A + E1) = 2¢ + Postage (1.85 oz) = 54¢ |
| 2. Cost (A + E2) = 2¢ + Postage (1.8 oz) = 54¢ |
| 3. Cost (A + E3) = 3¢ + Postage (1.75 oz) = 55¢ |
| 4. Cost (A + E4) = 3¢ + Postage (1.7 oz) = 55¢ |
| 5. Cost (A + E1 + E2) = 4¢ + Postage (2.0 oz) = 79¢ |
| 6. Cost (A + E1 + E3) = 5¢ + Postage (1.95 oz) = 57¢ |
| 7. Cost (A + E1 + E4) = 5¢ + Postage (1.9 oz) = 57¢ |
| 8. Cost (A + E2 + E3) = 5¢ + Postage (1.9 oz) = 57¢ |

TABLE II-continued

| Incremental Costs |
| --- |
| 9. Cost (A + E2 + E4) = 5¢ + Postage (1.85 oz) = 57¢ |
| 10. Cost (A + E3 + E4) = 6¢ + Postage (1.8 oz) = 58¢ |
| 11. Cost (A + E1 + E2 + E3) = 7¢ + Postage (2.1 oz) = 82¢ |
| 12. Cost (A + E1 + E2 + E4) = 7¢ + Postage (2.05 oz) = 82¢ |
| 13. Cost (A + E1 + E3 + E4) = 8¢ + Postage (2.0 oz) = 83¢ |
| 14. Cost (A + E2 + E3 + E4) = 8¢ + Postage (1.95 oz) = 60¢ |
| 15. Cost (A + E1 + E2 + E3 + E4) = 10¢ + Postage (2.15 oz) = 85¢ |

[Table II is based on the current rates in the USA. It can be easily changed to any other rate structure around the world. Also the worksharing option can be included without major complications.] It follows from the table that the minimal cost combination is the original assembly A without any optional enclosures. This is trivial and the least interesting case.

A "benefit function" is defined as follows. For purposes of describing the present invention, it will be assumed that each optional enclosure has a numerically valued benefit associated with it. For example, it can be an expected value of incremental business which the mail sender anticipates to generate as a result of inclusion of given inserts into an envelope. It can be determined, for instance, as the total incremental dollars generated as a result of the aggregate mailing divided by the number enclosures of a given type inserted in the mailing. For example, if as a result of sending 1,000 enclosures advertising sale of a piece of furniture the furniture store usually sells only one such a piece for $500, then the expected benefit of one advertising enclosure is $500/1,000 =50¢. Of course, the furniture store would not pay 50¢ per piece but would have to consider some acceptable margin for profit, for instance 80%. In this case the furniture store would be willing to pay 10¢ per advertising enclosure and realize gross profit margin of $400. The scheme may be as complex as desired. For example, the results of advertising can be measure for two different mailings, one in 1,000 pieces and another in 10,000 pieces and the difference can be evaluated. The results can be measured and normalized or known statistics can be used. The demographic information can be easily taken into account in arriving at estimated benefits for optional enclosures. Moreover, if the demographic information is available to the control computer during the mail assembly process, e.g., via a control document, it can be used to modify benefits "on the fly".

Generally, there are well known methods for measuring effectiveness of direct mail advertising which include well defined and understood procedures. See, for example, The Dartnell DIRECT MAIL AND MAIL ORDER HANDBOOK, by R. S. Hodgson, Third Edition-1980, Appendix O.

It is assumed that the benefit of each of the enclosures E1, E2, E3, E4 are 60¢, 12¢, 10¢ and 25¢ respectively. Then all the possible combinations will have the benefits listed in Table III. (The benefit of assembly A is set to 0 to simplify the description herein and the benefit is by definition an additive function to each of the combinations.)

TABLE III

| Benefit of the Enclosures |
| --- |
| 0. Benefit (A) = 0 |
| 1. Benefit (A + E1) = 60¢ |
| 2. Benefit (A + E2) = 12¢ |

TABLE III-continued
Benefit of the Enclosures

3. Benefit (A + E3) = 10¢
4. Benefit (A + E4) = 25¢
5. Benefit (A + E1 + E2) = 72¢
6. Benefit (A + E1 + E3) = 70¢
7. Benefit (A + E1 + E4) = 85¢
8. Benefit (A + E2 + E3) = 22¢
9. Benefit (A + E2 + E4) = 37¢
10. Benefit (A + E3 + E4) = 35¢
11. Benefit (A + E1 + E2 + E3) = 82¢
12. Benefit (A + E1 + E2 + E4) = 97¢
13. Benefit (A + E1 + E3 + E4) = 95¢
14. Benefit (A + E2 + E3 + E4) = 47¢
15. Benefit (A + E1 + E2 + E3 + E4) = 107¢

If the function VALUE defined as the difference between the benefit and the cost, then this results in Table IV.

TABLE IV
Value of the Enclosures

0. VALUE (A) = −52¢
1. VALUE (A + E1) = 6¢
2. VALUE (A + E2) = −42¢
3. VALUE (A + E3) = −45¢
4. VALUE (A + E4) = −30¢
5. VALUE (A + E1 + E2) = −7¢
6. VALUE (A + E1 + E3) = 13¢
7. VALUE (A + E1 + E4) = 28¢
8. VALUE (A + E2 + E3) = −35¢
9. VALUE (A + E2 + E4) = −20¢
10. VALUE (A + E3 + E4) = −23¢
11. VALUE (A + E1 + E2 + E3) = 0¢
12. VALUE (A + E1 + E2 + E4) = 15¢
13. VALUE (A + E1 + E3 + E4) = 12¢
14. VALUE (A + E2 + E3 + E4) = −13¢
15. VALUE (A + E1 + E2 + E3 + E4) = 22¢

It is clear from Table IV that the optimal value of 28¢ is found in line 7 which corresponds to the selection of enclosures E1 and E4. Thus, in accordance with the present invention optional enclosures E1 and E4 will be selected for the mailpiece. This is different from the selection of optional inserts pursuant to a "topping off" method. According to a "topping off" method, for example as in U.S. Pat. No. 4,639,873, inserts E2, E3 and E4 would be selected because the three optional inserts can be added to the mailpiece without exceeding the one ounce postage category of the mailpiece determined from the weight of the required enclosures W(A).

In general, the "topping off" method will produce the same results as the present invention only when the cost of material (Table II) and the benefit (Table III) is set to zero for all the optional enclosures. In such a case, the inserting machine cannot be operated to maximize the potential value of the mailpieces being assembled. Once cost and benefit are assigned to the optional enclosures an optimal value can be determined for each mailpiece, thus providing means for making an optimal selection of the optional inserts for each mailpiece.

Figure 2:
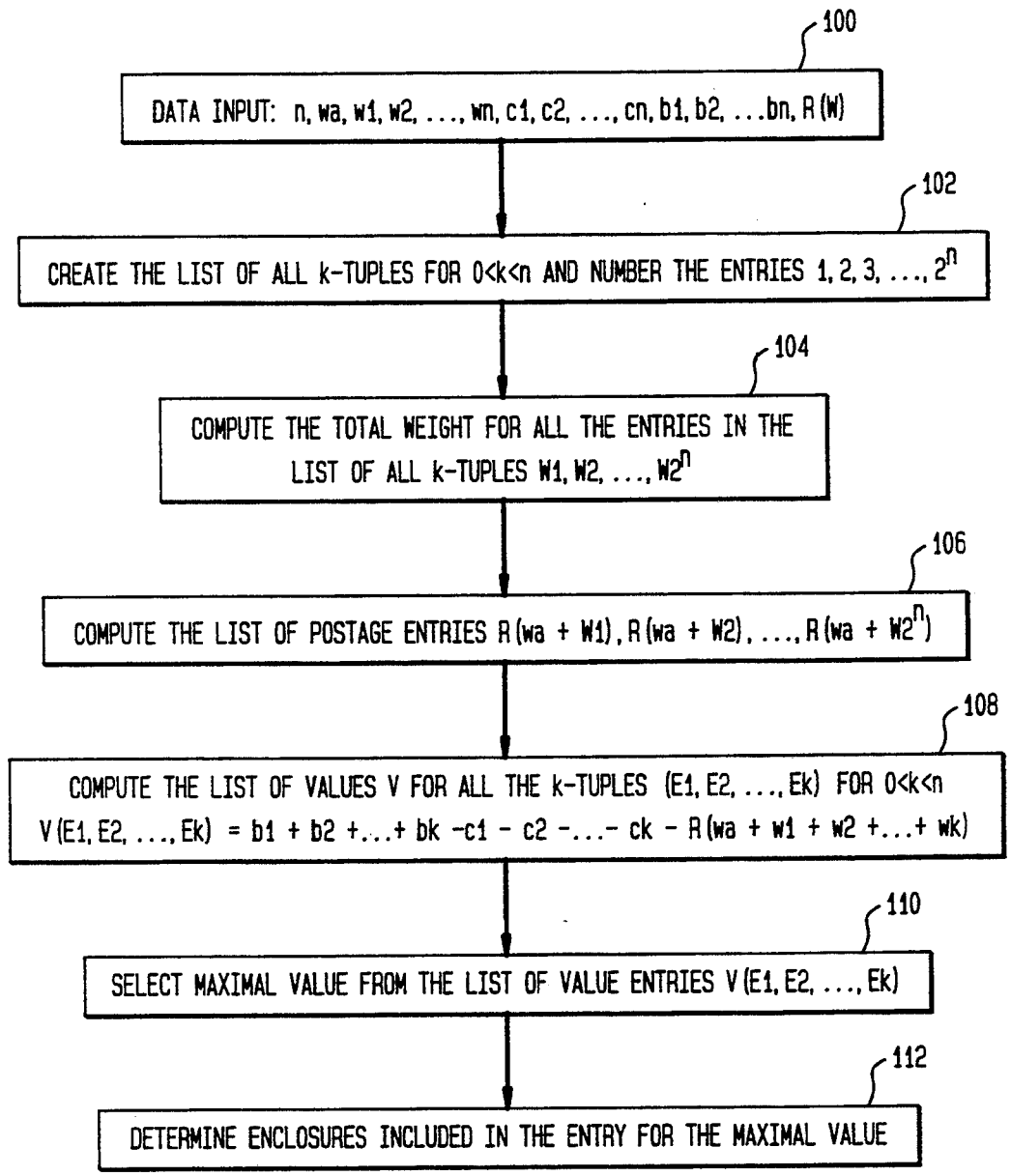
FIG. 2 is a flow chart depicting a procedure for selecting optional inserts in accordance with the present invention.

Referring now to FIG. 2, in accordance with the present invention there is provided a flowchart of an algorithm for computing optimal composition of a mailpiece based on optimal value of optional inserts. The overall process of optimization proceeds as follows with n being the total number of optional enclosures. In the example described herein, n=4 is the number of optional enclosures denoted by E1, E2, E3 and E4. At step 100, three numerical attributes, namely weight (w1, w2, ..., wn), cost (c1, c2, ..., cn) and expected benefit (b1, b2, ..., bn) for all optional enclosures are entered into an inserting machine control computer. The weight (wa) of the non-optional enclosures is also entered. R(W) is the rate function (or rate table) which defines the postage to be paid for the mailpiece with the weight W. If a change in the rate function is necessary, it is also entered. (It is noted that the expected benefit can be modified "on the fly" as described in U.S. Pat. No. 4,817,042.) After the expected benefits for all optional enclosures are entered, at step 102 the control processor (36 in FIG. 1) determines all the potential compositions of the mailpiece to be assembled. At step 104, the control processor computes the total weight (W1, W2, ..., $W2^n$) for all the potential compositions of the mailpiece. It is noted that W1 denotes an empty set, i.e., a mailpiece without any optional enclosures. At step 106, the control processor computes a postage rate for each of the potential compositions. At step 108, the control processor computes the Value for each of the potential compositions. At step 110, the processor selects the maximal value from the list of values computed for potential compositions. Finally, at step 112, the processor sends control signals to the appropriate optional enclosure feeders to realize the maximal value for the mailpiece. The foregoing steps are repeated for every mailpiece.

As previously described, the total number of potential compositions is $2^n$ where "n" is the number of optional enclosures. Typically, the number of such enclosures is between 2 and 8 and therefore the total number of possible combinations is between 4 and 256. For each of the possible combinations, the function VALUE is computed and the maximal value (which always exists) is selected. Then the combination corresponding to this maximal value is selected and the control system of the inserting machine executes the actual assembly process.

As a practical matter, the benefit attributes of all optional enclosures are not always known and sometimes cannot be estimated. In this case, the unknown benefits can be set to zero or to reasonably small values and the process of the present invention will select the minimal postage assembly. If the inclusion of optional enclosures was paid for by a third party then the benefit for these enclosures can be set based on the amount paid per item and a known weight distribution of the intended mail run. In this case, the third party is assured that all the enclosures will be sent while the mailing party, i.e., the party which is providing the insertion and mailing service, will be able to minimize the total postage paid for the mailing.

The value based algorithm in accordance with the present invention can be modified to accommodate sliding postal rates or any other arbitrarily complex postal rates as long as the postal rates are algorithmically computable based on the weight, worksharing or other desired attributes. The benefit value of the optional enclosure can be also set or modified by the control document or a control file for computerized data base driven inserting machines.

A very similar approach can be applied for optimization of the entire mail run. For example, if the entire mail run consists of 10,000 pieces and weight distribution of mandatory enclosures for all the mail pieces in the run is known before the process of actual mail assembly, i.e., insertion, sealing, postaging etc., takes place, one can define the value function for the entire run. This function would take into account the difference (or ratio or any arbitrary computable function)

between the benefit and the cost for the entire mail run. Thus, the determination of whether to include or not a given enclosure is based not on the total value of the given mailpiece but on the values for all mailpieces. This, of course, requires a prior knowledge of the weight distribution of mandatory enclosures for all the mailpieces in the mail run.

Figure 3:
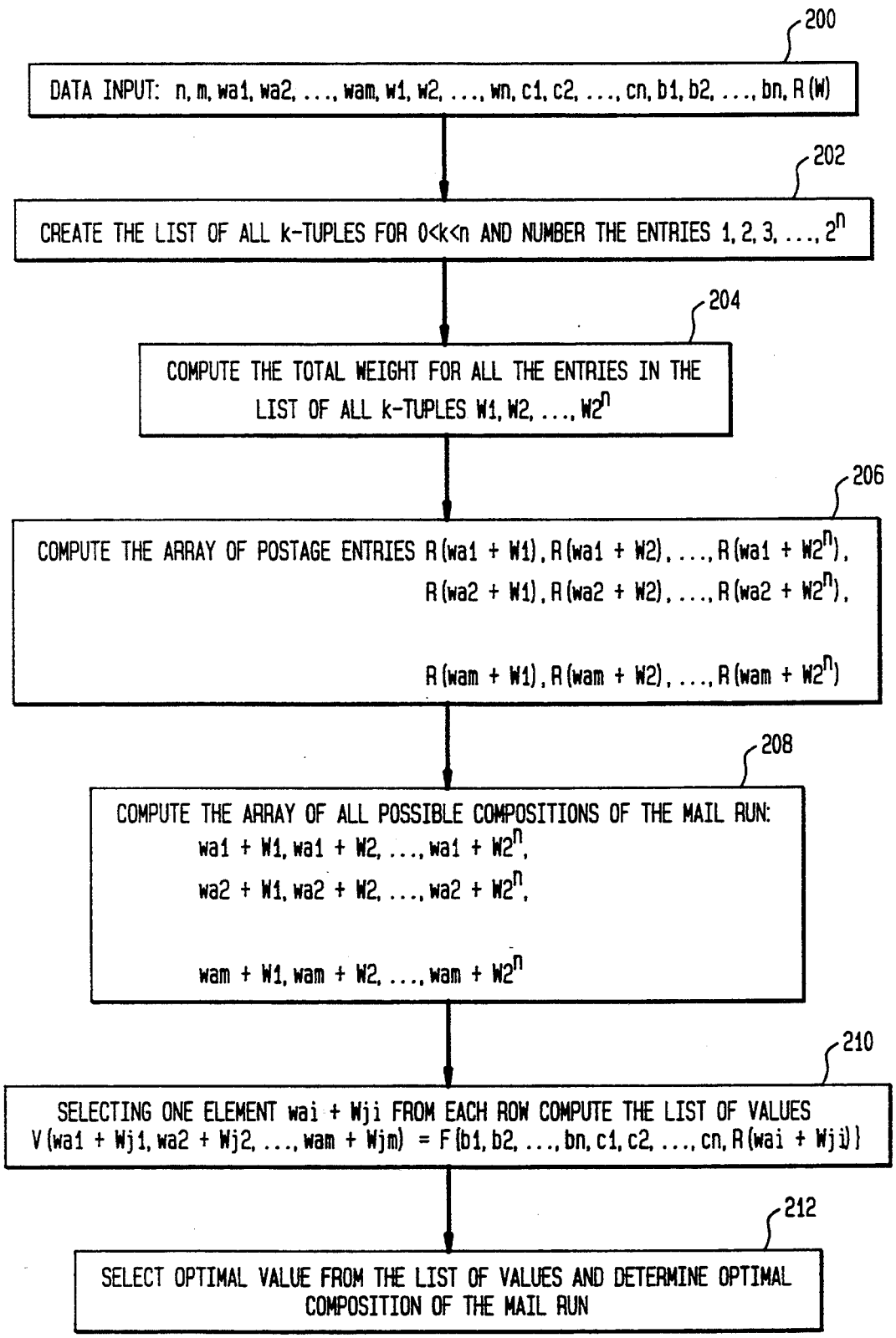
FIG. 3 is a flow chart depicting a procedure for determining an optimal composition of a mail run.

Referring now to FIG. 3, in accordance with the present invention there is provided a flowchart of an algorithm for determining the optimal composition of a mail run. The process of optimization of the mail run proceeds as follows with n being the total number of optional enclosures and m being the total number of mailpieces in the mail run. At step 200, three numerical attributes, namely weight ($w_1, w_2, \ldots, w_n$), cost ($c_1, c_2, \ldots, c_n$) and expected benefit ($b_1, b_2, \ldots, b_n$) for all optional enclosures are entered into an inserting machine control computer. The weight (wa) of the non-optional enclosures is also entered. R(W) is the rate function (or rate table) which defines the postage to be paid for the mailpiece with the weight W. If a change in the rate function is necessary, it is also entered. After the expected benefits for all optional enclosures are entered, at step 202 the control processor (36 in FIG. 1) determines all the potential compositions of a mailpiece to be assembled. At step 204, the control processor computes the total weight ($W_1, W_2, \ldots, W_{2^n}$) for all the potential compositions of the mailpiece. It is noted that W1 denotes an empty set, i.e., a mailpiece without any optional enclosures. At step 206, the control processor computes an array of postage rates ( $R(wam+W_{2^n})$) for each of the potential compositions for each of the mailpieces in a mail run. At step 208, the control processor computes an array of all possible compositions of the mail run. Then, at step 210, the control processor computes a list of potential values of the mail run by computing a value for each of the potential combinations of mailpieces in the mail run by selecting one element from each row in the array of possible compositions to compute a list of potential values of the mail run. The value function is shown as a general function of benefits, costs an postage rates $F[b_1, b_2, \ldots, b_n, c_1, c_2, \ldots, c_n, R(wai+Wji)]$, such as the difference between benefit and cost as shown in FIG. 2. It will be appreciated that other functions, such as a ratio of benefit to cost may also be used. Finally, at step 112, the processor selects an optimal value from the list of values computed for potential compositions of the mail run.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of making a selection of optional enclosures for a mailpiece including required enclosures, comprising the steps of:

assigning to each of the optional enclosures a weight, a cost and a benefit;

creating a list of potential compositions of the mailpiece, the potential compositions including a total of $2^n$ combinations of the optional enclosures, where n equals the number of optional enclosures;

computing a total weight of the mailpiece for each of the potential compositions;

computing an incremental cost of the mailpiece for each of the potential compositions, said incremental cost including the cost of each optional enclosure included in each of the potential compositions and a postage amount based on the total weight of the mailpiece for each of the potential compositions;

computing a value of the mailpiece for each of the potential compositions, the value being a computable function of the benefit and the incremental cost of each of the potential compositions;

selecting from the potential compositions the one providing an optimal value to determine which of the optional enclosures are to be included in the mailpiece; and using an inserting machine to assemble the mailpiece with the selected optional enclosures.

2. In a mailing system of the type having a processing means operable for selecting individual ones of a plurality of enclosure feeding stations for feeding optional enclosures contained therein for insertion in a mailpiece, the improvement comprising;

means for entering enclosure related data into the processing means, said data including a weight, a cost and a benefit for each type of the optional enclosures;

means for creating a list in the processing means of potential compositions of the mailpiece, the potential compositions including a total of $2^n$ combinations of the optional enclosures, where n equals the number of optional enclosures;

means for computing in the processing means a total weight of the mailpiece for each of the potential compositions;

means for computing in the processing means an incremental cost of the mailpiece for each of the potential compositions, said incremental cost including the cost of each optional enclosure included in each of the potential compositions and a postage amount based on the total weight of the mailpiece for each of the potential compositions;

means for computing in the processing means a value of the mailpiece for each of the potential compositions, the value being a computable function of the benefit and the incremental cost of each of the potential compositions; and means for selecting from one of the potential compositions based on the one having an optimal value wherein the individual ones of the plurality of enclosure feeding stations are selected by said means for selecting based on the selected one of the potential compositions.

3. The improvement of claim 2 wherein the means for computing said value of the mailpiece includes subtracting the cost from the benefit of each optional enclosure included in each of the potential compositions.

4. A method of optimizing an entire mail run comprising the steps of:

entering the weight of each non-optional enclosure;

entering for each optional enclosure a weight, a cost and a benefit;

creating a list of the potential compositions for each of the mailpieces in the mail run, the potential compositions including a total of $2^n$ combinations of the optional enclosures for each of the mailpieces, where n equals the number of optional enclosures;

computing a total weight for each of the potential compositions for each of the mailpieces in the mail run;

computing an array of postage entries including postage for each of the potential compositions for each of the mailpieces in the mail run;

computing an array of all possible compositions of the mail run;

computing a list of potential values of the mail runs by computing a value for each of the potential combinations of mailpieces in the mail run;

selecting an optimal value from the list of values to determine the selection of optional enclosures for each of the mailpieces of the mail run for providing an optimal composition of the mail run; and using an inserting machine to assemble the mailpieces with the selected optional enclosures.

5. A method of selectively determining which ones of a plurality of different enclosure types are to be provided by a mailing system for inclusion within a mailpiece, the system comprising a processing means operable at least for having enclosure related data therein and also for selectively activating individual ones of a plurality of enclosure feeding stations for feeding individual ones of an enclosure type contained therein, the method comprising the steps of:

entering into the processing means data indicative of a weight, a cost and a benefit for each of the optional enclosures;

generating in the processing means a list of potential compositions of the mailpiece;

determining in the processing means a total weight of the mailpiece for each of the potential compositions;

determining an incremental cost of the mailpiece for each of the potential compositions, said incremental cost including a postage amount based on the total weight of the mailpiece for each of the potential combinations;

determining a value of the mailpiece for each of the potential compositions, the value being a function of the benefit and the cost of each optional enclosure included in each of the potential compositions; and selecting from the potential compositions the one providing the optimal value wherein the individual ones of the plurality of enclosure feeding stations are selected based on the selected one of the potential compositions.

* * * * *